Patented Sept. 25, 1928.

1,685,758

UNITED STATES PATENT OFFICE.

DONALD K. TRESSLER, OF PITTSBURGH, PENNSYLVANIA, ASSIGNOR TO LARROWE CONSTRUCTION COMPANY, OF DETROIT, MICHIGAN, A CORPORATION OF MICHIGAN.

PREPARATION OF BETAINE HYDROCHLORIDE, ETC.

No Drawing.   Application filed July 13, 1925.   Serial No. 43,396.

This invention relates to the manufacture of betaine hydrochloride, glutamic acid and potash salts, from the residual liquors of the beet sugar industry remaining after the separation and recovery of available sugar from the molasses.

It has heretofore been proposed to treat the concentrated residual liquors with an excess of hydrochloric acid sufficient in amount to effect the precipitation of betaine hydrochloride, glutamic acid and potassium chloride. Such processes require acid-resistant apparatus together with a considerable excess of hydrochloric acid, sufficient to saturate the solution.

According to the present invention, the use of such an excess of hydrochloric acid is avoided. I have found that the use of such an excess of acid is not necessary and that betaine hydrochloride and potassium chloride, either without or with glutamic acid hydrochloride, can be readily separated from the concentrated residual liquor by the addition to the acidified liquor of a chloride which is more soluble in water than potassium chloride, such as calcium chloride, magnesium chloride or ammonium chloride. I have found that the addition of such chlorides to the acidified liquor brings about a salting out of the constituents mentioned.

If the acidified solution is allowed to become hot, or is heated to a sufficiently high temperature, glutamic acid hydrochloride will be formed and precipitated along with betaine hydrochloride and potassium chloride. If, however, the solution is kept cool during the process, the glutamic acid hydrochloride is not precipitated but betaine chloride and potassium chloride are precipitated. This precipitation is moreover effected from a solution which does not contain any large excess of hydrochloric or other acid. The equipment used, therefore, does not need to be resistant against such an excess of acid. Large amounts of acids can also be avoided with resulting economy.

Where the process is carried out in the cold, and where betaine hydrochloride and inorganic chlorides are first precipitated, these may be separated by filtration and the mother liquor then heated to around 80° C. or higher to hydrolyze the glutamic acid compounds in the liquor, e. g., glutamine. By neutralizing the solution with soda or with other basic material to hydrogen-ion concentration just neutral to methyl orange, the glutamic acid is precipitated since it is nearly insoluble in such a solution. The glutamic acid prepared in this way may be purified by dissolving it in a small amount of dilute hydrochloric acid and reprecipitating it by making the solution neutral to methyl orange.

The invention will be further illustrated by the following specific example of the procedure followed in effecting the separation of the potassium salts, betaine hydrochloride and glutamic acid from the desaccharified molasses. The parts are by weight.

Concentrated Steffens' waste-water, or other desaccharified beet molasses, having a specific gravity between 1.29 and 1.42, is made acid to thymol blue by the addition of a strong acid, such as sulfuric, phosphoric, or hydrochloric acid. The solution is constantly stirred during addition of the acid in order to prevent the heat formed during neutralization from heating any portion of the solution above 80° C. Seventy parts of powdered anhydrous calcium chloride are then added for each 100 parts of water present in the solution. This addition is most easily effected by heating the solution to 50° C. and then slowly stirring in the required amount of calcium chloride. Upon standing for 12 hours or longer, a mixture of betaine hydrochloride, potassium chloride and sodium chloride crystallizes out. These crystals are separated from the mother liquor in a basket centrifuge and washed with a little hydrochloric acid. The betaine hydrochloride may then be extracted with hot methanol from the mixed crystals. Upon cooling the methanol solution, the betaine hydrochloride crystallizes out. The residue in the extractor consists of a mixture of potassium chloride (about 80%) and sodium chloride (about 20%).

The mother liquor from the mixed crystals of betaine hydrochloride and inorganic chlorides may advantageously be used for the preparation of glutamic acid. This may be effected by hydrolyzing the glutamic acid compound (probably glutamine) contained in the solution by heating the liquor to 80–100° C. for eighteen hours or longer. Being soluble in acidified solutions, the glutamic acid remains in solution. It is precipitated by adding caustic soda or other base until the solution is neutral to methyl orange. The glutamic acid may be recovered by filtration.

When prepared in this manner, the glutamic acid is light brown. It may be purified by dissolving it in a little dilute hydrochloric acid, filtering the resultant solution, and reprecipitating the glutamic acid by making the solution neutral to methyl orange.

Other chlorides, e. g., magnesium, aluminum or ammonium chloride may be used for the salting out of the betaine hydrochloride and in organic chlorides. In any case, sufficient of the chloride is added to saturate the water, contained in the desaccharified molasses, at the temperature at which the solution is filtered.

In case calcium chloride is available in solution instead of in the anhydrous solid form, the procedure may advantageously be modified and carried out as follows:

Sufficient strong acid (hydrochloric, sulfuric, phosphoric or other acid) is added to concentrated Steffens' waste, or other desaccharified beet molasses, to make the solution slightly acid to litmus. Twenty parts of calcium chloride in solution is added for each 100 parts of dry Steffens' waste contained in the solution, and the solution is evaporated until it just remains liquid when cooled to room temperature. Sufficient strong hydrochloric acid is then added to make the solution acid to methyl orange. After the crystallization of the potassium and sodium chlorides and the betaine hydrochloride, the crystals are filtered off and the betaine hydrochloride extracted therefrom with methanol, as described above. Glutamic acid may be recovered from the mother liquor, after the crystallization of the sodium and potassium chlorides, and of the betaine hydrochloride, according to the procedure above described.

Among the advantages which the process of the present invention presents may be mentioned the following:—A nearly quantitative separation of betaine hydrochloride, potassium salts and glutamic acid is effected from the sugars, organic acids, etc. which constitute the residue of the desaccharified molasses. The betaine hydrochloride and glutamic acid can be separated in a pure form from the desaccharified molasses without the use of expensive organic solvents. No large amount of acid is required to effect the precipitation of the salts nor are the solutions strongly acid at any time during the process so that acid-resistant apparatus need not be used.

I claim:

1. The method of treating concentrated residual liquors of beet molasses which comprises adding a mineral acid and a soluble chloride to the concentrated liquors.

2. The method of treating concentrated residual liquors of beet molasses which comprises adding to the liquor an acid in sufficient amount to acidify the liquor and also adding thereto a soluble chloride in sufficient amount to precipitate betaine hydrochloride therefrom.

3. The method of treating concentrated residual liquors of beet molasses which comprises adding to the liquor an acid in sufficient amount to acidify the liquor and also adding thereto a soluble chloride in sufficient amount to precipitate betaine hydrocloride therefrom, and subsequently heating the mother liquor and neutralizing the liquor to precipitate glutamic acid therefrom.

4. The method of treating residual liquor from beet molasses which comprises acidifying the concentrated liquor and adding calcium chloride thereto in sufficient amount to precipitate betaine hydrocloride and potassium chloride.

5. The method of treating concentrated residual liquors of beet molasses which comprises adding thereto hydrochloric acid and a soluble chloride.

6. The method of treating concentrated residual liquors of beet molasses which comprises adding to the liquor hydrochloric acid in sufficient amount to acidify the liquor and also adding thereto a soluble chloride in sufficient amount to precipitate betaine hydrochloride therefrom.

7. The method of treating concentrated residual liquors of beet molasses which comprises adding to the liquor hydrochloric acid in sufficient amount to acidify the liquor and also adding thereto a soluble chloride in sufficient amount to precipitate betaine hydrochloride therefrom, and subsequently heating the mother liquor and neutralizing the liquor to precipitate glutamic acid therefrom.

8. The method of treating residual liquor from beet molasses which comprises acidifying the concentrated liquor with hydrochloric acid and adding calcium chloride thereto in sufficient amount to precipitate betaine hydrochloric and potassium chloride.

In testimony whereof I affix my signature.

DONALD K. TRESSLER.